(12) United States Patent
Paielli

(10) Patent No.: US 12,429,586 B2
(45) Date of Patent: Sep. 30, 2025

(54) DUAL DATA ENCODING IN A PULSE WIDTH MODULATION SIGNAL

(71) Applicant: Dana Automotive Systems Group, LLC, Maumee, OH (US)

(72) Inventor: Perry M. Paielli, Sand Creek, MI (US)

(73) Assignee: DANA AUTOMOTIVE SYSTEMS GROUP, LLC, Maumee, OH (US)

(*) Notice: Subject to any disclaimer, the term of this patent is extended or adjusted under 35 U.S.C. 154(b) by 374 days.

(21) Appl. No.: 18/059,831

(22) Filed: Nov. 29, 2022

(65) Prior Publication Data

US 2024/0176020 A1    May 30, 2024

(51) Int. Cl.
*G01S 17/00* (2020.01)
*G01S 17/14* (2020.01)
*G01S 17/26* (2020.01)

(52) U.S. Cl.
CPC .............. *G01S 17/14* (2020.01); *G01S 17/26* (2020.01)

(58) Field of Classification Search
USPC ....................................................... 356/5.05
See application file for complete search history.

(56) References Cited

U.S. PATENT DOCUMENTS

| | | |
|---|---|---|
| 4,915,072 A | 4/1990 | Caron et al. |
| 10,551,253 B2 | 2/2020 | Coughlan |
| 11,114,206 B2 | 9/2021 | Coke et al. |
| 12,074,542 B2* | 8/2024 | Hara .................. H02P 27/12 |
| 2016/0187519 A1* | 6/2016 | Widmer .................. G01V 3/10 324/222 |
| 2017/0328788 A1* | 11/2017 | Coughlan ................. F02C 6/12 |
| 2019/0108913 A1* | 4/2019 | Coke .................... A61B 5/0507 |
| 2021/0389547 A1* | 12/2021 | Karam ...................... H05B 3/84 |
| 2022/0345060 A1* | 10/2022 | Hara .................. H02P 27/12 |

FOREIGN PATENT DOCUMENTS

| | | | |
|---|---|---|---|
| CN | 107764427 B | | 10/2019 |
| CN | 110608660 B | | 11/2021 |
| JP | 2009171640 A | * | 7/2009 |
| WO | WO-2022180367 A1 | * | 9/2022 | ............ H02M 1/007 |

* cited by examiner

*Primary Examiner* — James R Hulka
(74) *Attorney, Agent, or Firm* — McCoy Russell LLP

(57) ABSTRACT

Methods and systems are provided for encoding position and temperature in a pulse width modulation (PWM) signal. The method includes acquiring a PWM signal from an eddy current sensor, and determining the temperature of the eddy current sensor based on a PWM signal feature. The PWM signal feature is a PWM frequency and/or a PWM logic level.

18 Claims, 5 Drawing Sheets

DUAL DATA ENCODING IN A PULSE WIDTH MODULATION SIGNAL

TECHNICAL FIELD

The present description relates generally to systems and methods for encoding temperature data and position data in a pulse width modulation signal

BACKGROUND AND SUMMARY

An eddy current sensor may be used to determine a position of an electrically conductive target. The eddy current sensor may include a sensor coil configured to output a magnetic field extending outward from the eddy current sensor. The electrically conductive target may interact with the magnetic field resulting in an eddy current resulting in a change of impedance at the sensor coil which is proportional to a distance between the electrically conductive target and the sensor coil.

The eddy current sensor may be configured to measure a dynamically changing position of a component (e.g., a target object) and output the position to a controller of a system comprising the component. In some examples, a temperature of the component may also be demanded by the controller to optimize a performance the system. A temperature change of the eddy current sensor may also cause changes in the eddy current and the resulting sensor coil impedance. For this reason, eddy current sensors often include a means of measuring and compensating for temperature changes. A method for outputting a temperature of the component as well as the position of the object from the eddy current sensor may be desired.

As one example, a method for sensing temperature includes acquiring a pulse width modulation (PWM) signal from an eddy current sensor, and determining a temperature of the eddy current sensor based on a PWM signal feature, wherein the PWM signal feature is a PWM frequency and/or a PWM logic level. In this way, an auxiliary dedicated temperature sensor may be avoided and cost of the component may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2A:
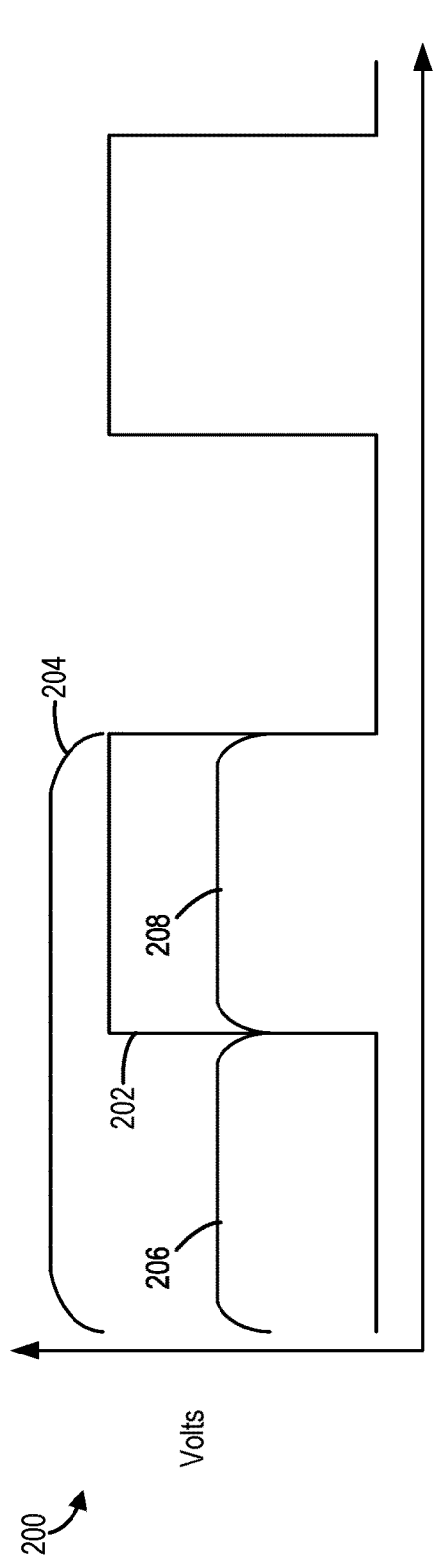
FIG. 2A shows an example of a PWM signal with a first duty cycle and with a first frequency.
Figure 3:
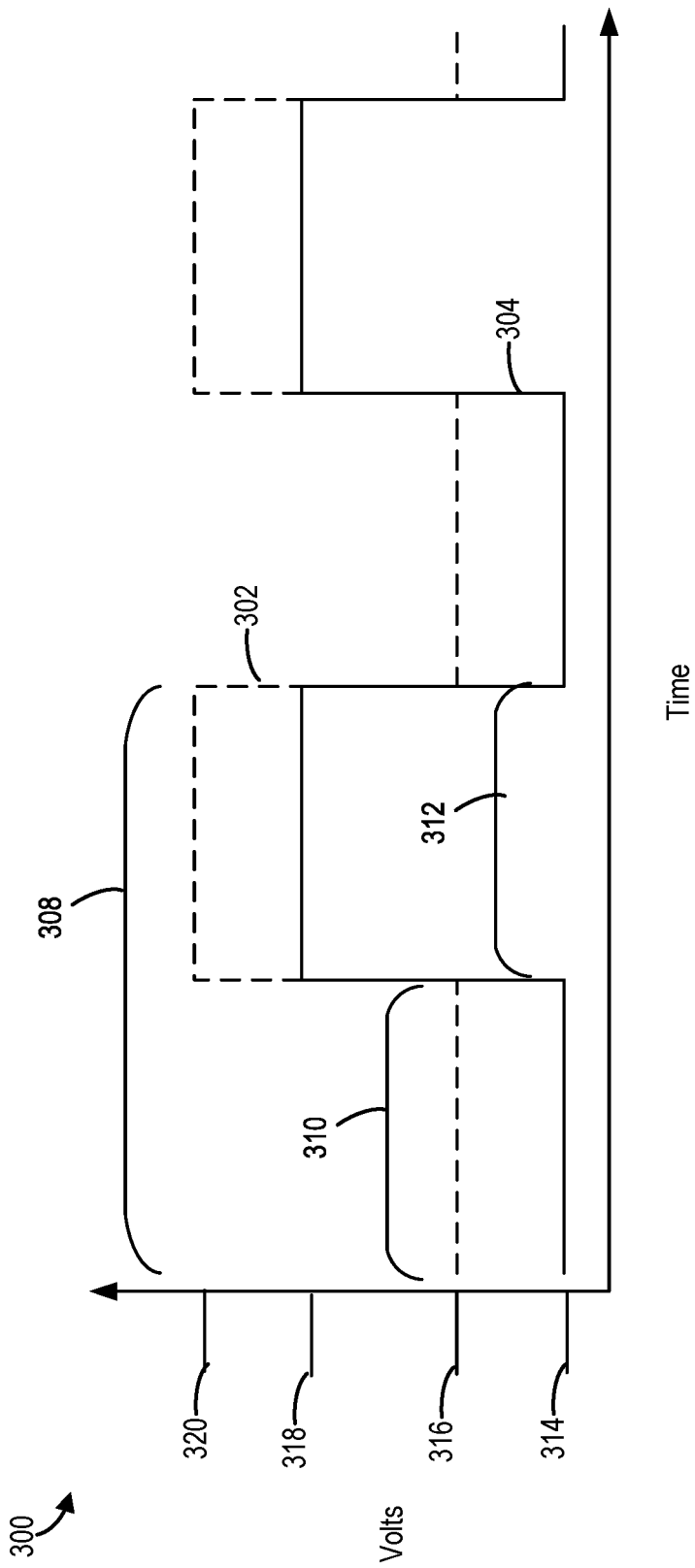
FIG. 3 shows an example of a PWM signal with the first duty cycle and with a first set of logic levels and an example of PWM signal with the first duty cycle and with a second set of logic levels.
Figure 4:
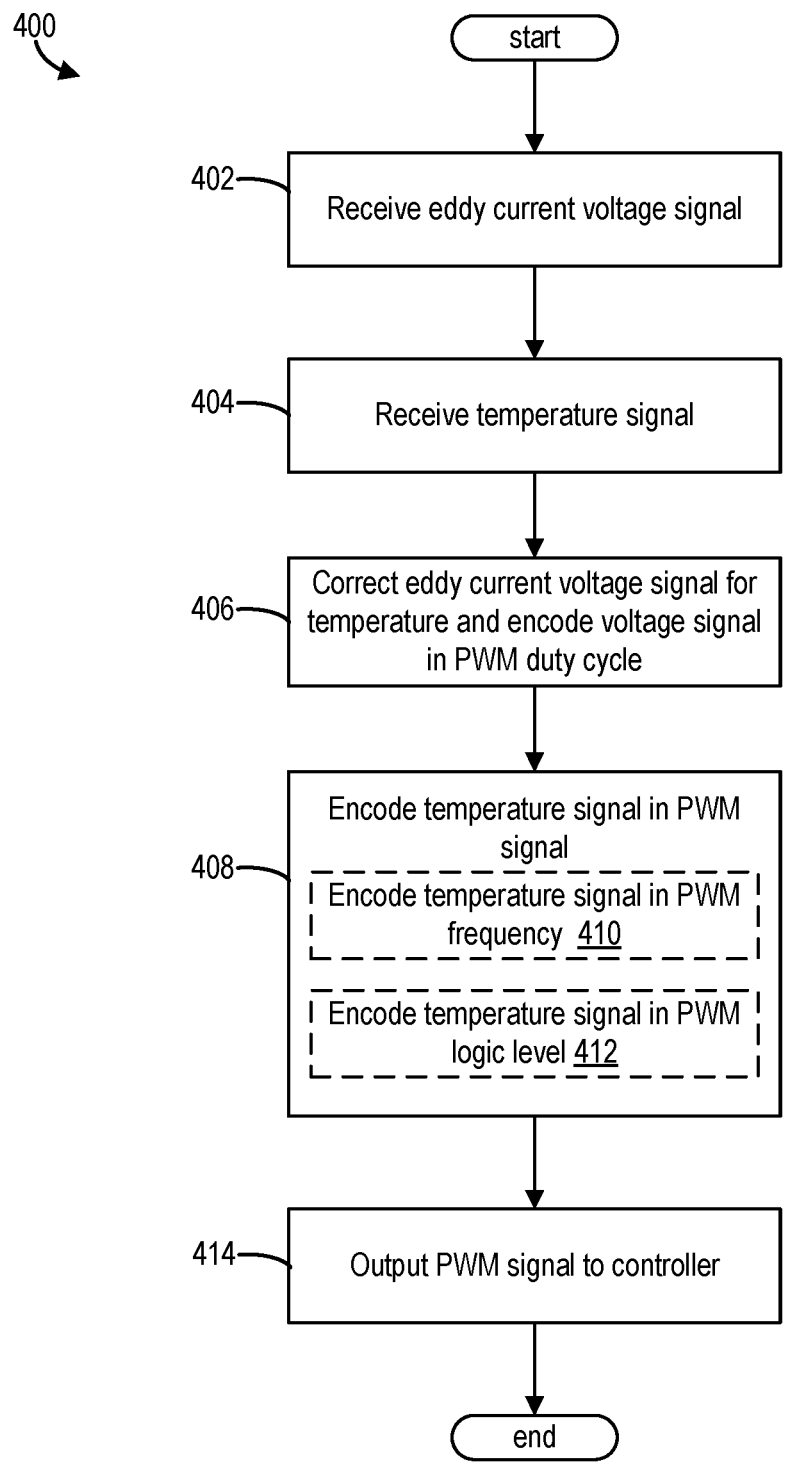
FIG. 4 shows a flow chart of an example of a method for an eddy current sensor outputting a PWM signal encoding position and temperature.
Figure 5:
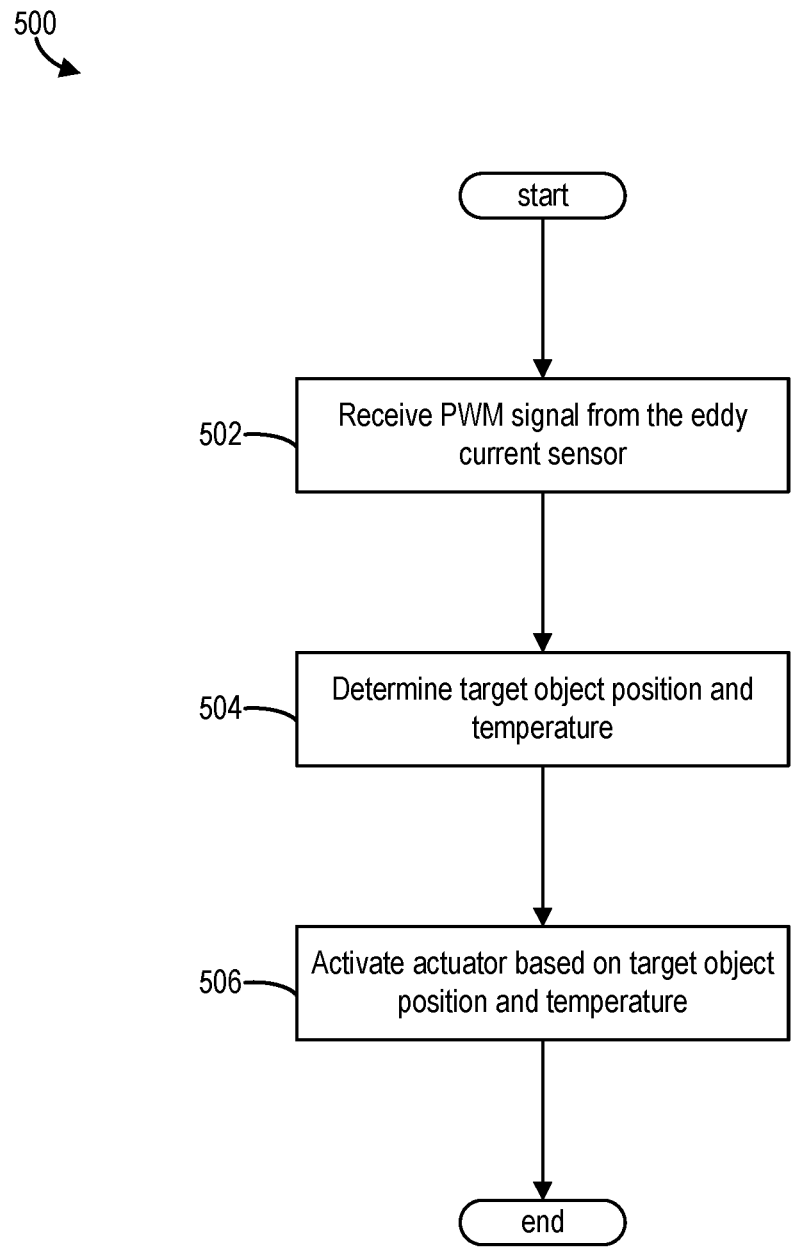
FIG. 5 shows a flow chart of an example of a method for acquiring a PWM signal for encoding position and temperature at a controller.

The following description relates to systems and methods for encoding position and temperature reported by an eddy current sensor into a single pulse width modulation (PWM) signal. The PWM signal may be communicated from the eddy current sensor to a controller as described in the block diagram shown in FIG. 1. A pulse width modulation signal may include repeated pulses which rapidly change from a baseline voltage level to a high or lower level voltage level and then returns back to the baseline voltage level. A duty cycle, frequency, and logic levels of the PWM signal may each be varied independently as shown in FIGS. 2A-3. As described herein, the duty cycle may encode the position of the object being sensed while frequency or logic levels may be used to encode the temperature. An example of a method for an eddy current sensor outputting an encoded PWM signal is shown in FIG. 4 and a method for acquiring the PWM signal encoding both position and temperature at a controller is shown in FIG. 5.

Figure 1:
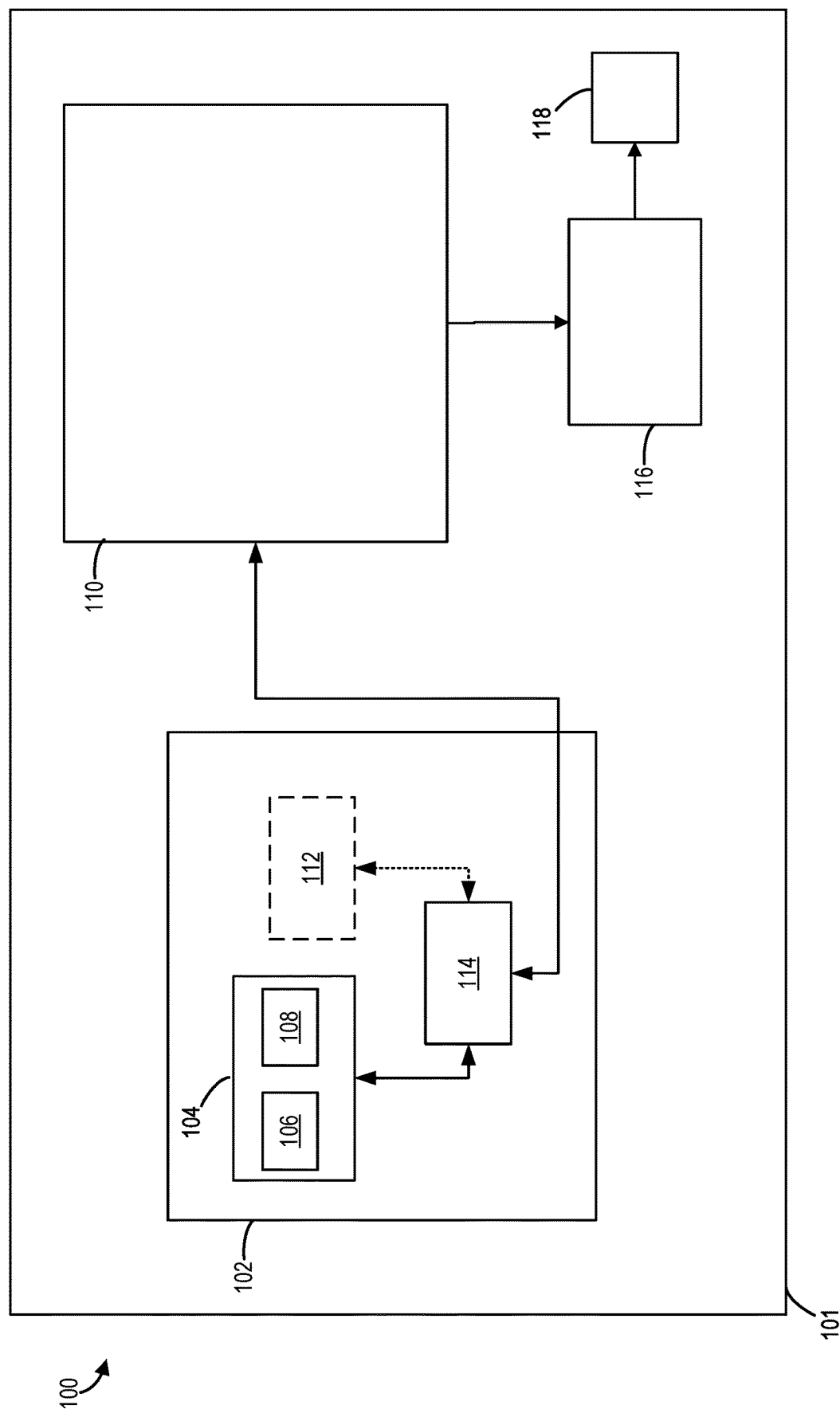
FIG. 1 shows a block diagram including an eddy current sensor and a controller

Turning now to FIG. 1, a block diagram 100 of an eddy current sensor 102, controller 110, actuator 116, and component 118 is shown. In one embodiment, eddy current sensor 102, controller 110, actuator 116 and component 118 may be included in a system 101. Eddy current sensor 102 may be configured to sense a position of a target object and a temperature of the target object and output the object position and temperature to controller 110. In response to the temperature and position received from eddy current sensor 102, controller 110 may control an actuator 116. As one example, system 101 may be a vehicle and controller 110 may be a controller of a vehicle and eddy current sensor 102 may be configured to sense a position of a component of the vehicle. As another example, system 101 may be a powertrain of a vehicle. As a further example, system 101 may be a transmission or a differential of a vehicle.

Eddy current sensor 102 may include a semiconductor circuit 104 and a microcontroller 114. Semiconductor circuit 104 may include a sensor coil 106 and a voltage source 108. As one example, sensor coil 106 may be a coil winding configured to emit a magnetic field when energized by voltage source 108. Semiconductor circuit 104 may be configured to sense an eddy current generated by interaction of the target object and a characteristic voltage (e.g., Vmeasurement) of the eddy current, related to the position of the target object, may be measured by semiconductor circuit 104 and output to microcontroller 114.

Vmeasurement may also change as a temperature of eddy current sensor 102 and the target object change. In one embodiment, semiconductor circuit 104 may also be configured to correct Vmeasurement for temperature variations. As one example, semiconductor circuit 104 may include switches configured to isolate sensor coil 106 from a remainder of semiconductor circuit 104. When sensor coil 106 is isolated from semiconductor circuit 104, semiconductor circuit 104 may output a temperature dependent voltage (e.g., Vbackground) to microcontroller 114 related to a temperature of eddy current sensor 102 and not dependent on the position of the target object. Eddy current sensor 102 may be in close proximity to the target object and the temperature of the target object may be estimated to be equal to the temperature of the target object. Microcontroller 114 may include instructions for correcting Vmeasurement based on Vbackground. A corrected Vmeasurement may be encoded into a duty cycle of PWM signal by microcontroller 114 and output to controller 110.

In an alternate embodiment, eddy current sensor 102 may include a temperature sensing circuit 112. Temperature sensing circuit 112 may be configured to output a temperature signal (e.g., a current or voltage) related to the temperature of the eddy current sensor to microcontroller 114. Microcontroller 114 may correct Vmeasurement based on the temperature signal sent by temperature sensing circuit 112 to obtain the corrected Vmeasurement. Additionally, microcontroller 114 may include instructions for encoding Vbackground and/or the temperature signal into a frequency or logic level of the PWM signal.

Controller 110 may receive the PWM signal output by eddy current sensor 102. Controller 110 may include instructions for determining a position of the target object based on the corrected Vmeasurement encoded in the duty cycle of the PWM signal. Additionally, controller 110 may include instructions for determining a temperature of the target object based on the temperature information (e.g., Vbackground and/or the temperature signal) encoded into the frequency and/or logic level of the PWM signal. Further, controller 110 may be communicatively coupled to an actuator 116 and may activate actuator 116 in response to target object position and temperature determined from the PWM signal. Actuator 116 may be further coupled to a component 118. Activation of actuator 116 may result in physical movement and/or change in configuration of component 118. In some examples, component 118 may be the target object being sensed by eddy current sensor 102.

For example, in the embodiment where system 101 is a vehicle, component 118 (e.g., the target object) may be a locking gear of a locking differential. In response to a position and temperature of the locking determined by controller 110 from a PWM signal output by an eddy current sensor positioned on the locking gear, controller 110 may send a signal to actuator 116 which may be an electromagnetic solenoid configured to move the locking gear.

Turning now to FIG. 2A, a plot 200 is shown of voltage as a function of time for a first PWM signal 202. As described above, the PWM may rapidly change from a baseline level to a higher level and back to the baseline level. A cycle time ($T_{cycle}$) of a PWM signal may be a time the signal is at the baseline level and then at the higher level before returning to the baseline. A $T_{cycle}$ of first PWM signal 202 is shown by bracket 204. The reciprocal of $T_{cycle}$ ($1/T_{cycle}$) is equal to a frequency of the PWM signal. An amount of time the PWM signal is at the baseline level during $T_{cycle}$ is a $T_{off}$. $T_{off}$ of first PWM signal 202 is shown by bracket 206. An amount of time the PWM signal is at the high level during $T_{cycle}$ is a $T_{on}$ of PWM signal. $T_{on}$ of first PWM signal 202 is shown by bracket 208. A duty cycle of the PWM signal is defined $T_{on}$ divided by $T_{cycle}$. As one example, duty cycle may be given as a percent value. For example, if $T_{on}$ of first PWM signal 202 is equal to T1 and $T_{off}$ of PWM signal is also equal to T1, then $T_{cycle}$ of first PWM signal 202 may be equal to two times T1, a duty cycle of first PWM signal 202 may be equal to 50% and a frequency of first PWM signal 202 may be equal to 1/T1. In the example, a controller receiving first PWM signal 202 from an eddy current sensor may determine that the target object is at a first position based on the 50% duty cycle and the target object is at a first temperature based on the 1/T1 frequency.

Figure 2B:
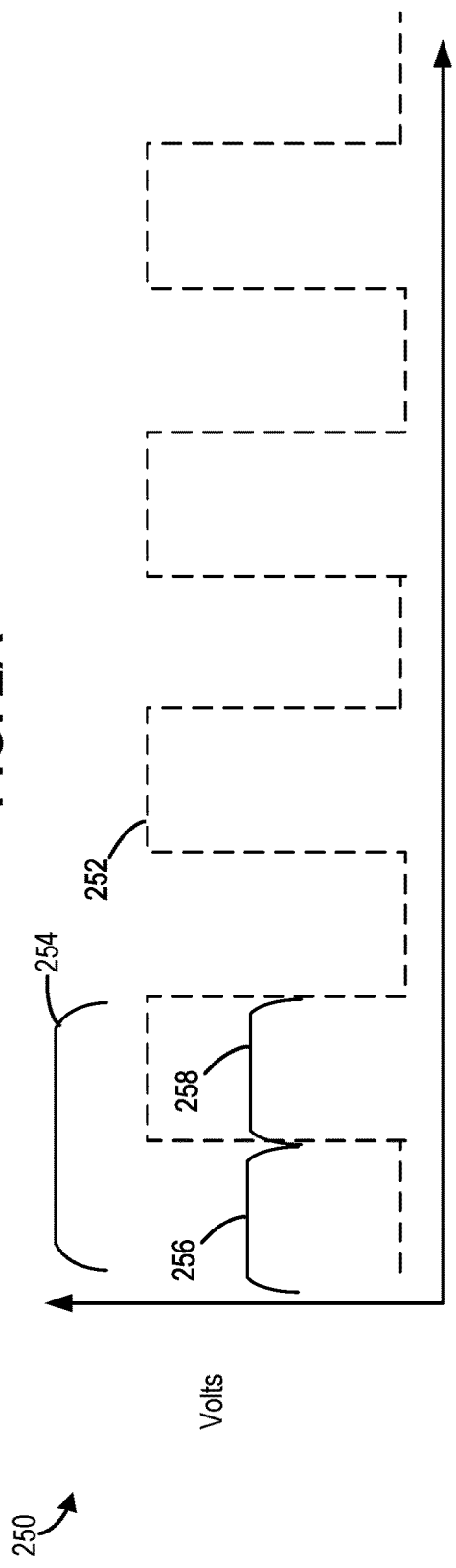
FIG. 2B shows an example of a PWM signal with the first duty cycle and with a second frequency.

Turning now to FIG. 2B, a plot 250 is shown of voltage as a function of time for a second PWM signal 252. $T_{cycle}$ of second PWM signal is shown by bracket 254, $T_{off}$ of second PWM signal 252 is shown by bracket 256, and $T_{on}$ of second PWM signal is shown by bracket 258. Continuing with the example of the first PWM signal 202, $T_{on}$ of second PWM signal 252 may be equal to T2 and $T_{off}$ of second PWM signal is also equal to T2, T2 being less than T1. Therefore, $T_{cycle}$ of second PWM signal 252 may equal to two times T2. A duty cycle of second PWM signal 252 is equal to 50% and the frequency of second PWM signal 252 is equal to 1/T2. In this example, a controller receiving second PWM signal 252 from an eddy current sensor may determine that the target is object is at the first position based on the 50% duty cycle and the target object is at a second temperature based on the 1/T2 frequency. In this way, a PWM signal such as first PWM signal 202 and second PWM signal 252 may encode the same position (e.g., duty cycle) but also encode different information regarding the temperature of the target object based on different PWM frequencies.

Turning now to FIG. 3 a plot 300 of voltage as function of time for a third PWM signal 302 (shown by a dashed plot) and a fourth PWM signal 304 is shown. Both third PWM signal 302 and fourth PWM signal 304 have the same $T_{cycle}$ shown by bracket 308, the same $T_{off}$ shown by bracket 310 and the same $T_{on}$ shown by bracket 312. A duty cycle of third PWM signal 302 and fourth PWM signal 304 may be the same. As one example the duty cycle of third PWM signal 302 and fourth PWM signal may be 50%.

Third PWM signal 302 may have a baseline equivalent to a V1 as indicated by line 314 on the y-axis of plot 300. The baseline voltage level may also herein be referred to as a low logic level. Additionally, third PWM signal 302 may have a high voltage level equivalent to a V2 as indicated by line 318 on the y-axis of plot 300. The high voltage level may also herein be referred as a high logic level. Fourth PWM signal 304 may have a low logic level equivalent to V3 as indicated by line 316 on the y-axis of plot 300 and a high logic level equivalent to V4 as indicated by line 320 on the y-axis of plot 300. As one example, V1 may be less than V3 and V2 may be less than V4. In this example, a controller receiving third PWM signal 302 from an eddy current sensor may determine that the target object is at a first position based on the 50% duty cycle and that the target object is at a first temperature based on the high logic level and/or the low logic level of third PWM signal 302. The controller receiving fourth PWM signal 304 from the eddy current sensor may determine that the target object is also at the first position because the duty cycle of fourth PWM signal 304 is the same as the duty cycle of third PWM signal 302. Further the controller receiving fourth PWM signal 304 may determine the target object is at a second temperature based on the high-logic level and/or the low logic level of fourth PWM signal 304. In this way, a PWM signal such as third PWM signal 302 and fourth PWM signal 304 may encode the same position (e.g., duty cycle) but also encode different information regarding the temperature of the target object based on different high logic levels and/or low logic levels of the PWM signals.

As described above, temperature of the target object may be encoded in a feature of the PWM signal. The feature may be a frequency of the PWM signal or a logic level of the PWM signal. In one embodiment, the eddy current sensor may be configured to detect a position of more than one target in object. In such examples, the feature of the PWM signal used for encoding temperature may be assigned to a target object. For examples, temperature of a first target object may be encoded in the frequency of the PWM signal and temperature of a second target object may be encoded in the logic level of the PWM signal. In an alternate embodiment, the feature used to encode the temperature may be selected based on a data resolution of the temperature signal. For example, a voltage component of a PWM signal may be resolved at every 0.1V while a time component of a PWM signal may be resolved at every 0.0001 s. In such an example, the frequency of the PWM signal in which the time component of the PWM may be adjusted with a higher resolution than the logic level for which the voltage component is adjusted. Accordingly, in the above example, frequency may be chosen to encode the temperature if a high resolution is desired and logic level may be chosen if a low resolution is desired. Additionally or alternatively, either logic level or frequency of the PWM signal may be chosen based on a demanded speed at which the temperature signal updates. In such an example, a speed at which the PWM signal may be updated may depend on the feature being updated. For example, a frequency of a PWM signal may be updated at a first rate and a logic level of the PWM signal may be updated at a second rate, the first rate may be faster than the second rate or vice versa. In such an example a speed at which the controller may demand an updated temperature signal may correspond be met by the faster of the two rates but not the slower. Accordingly, the feature of the PWM signal may be chosen to correspond to the faster update speed.

Turning now to FIGS. 4-5 examples of a methods for sensing temperature is shown. Method 400 may be at least partially implemented as executable instructions stored in a non-transitory microcontroller memory (e.g., ROM) of an eddy current sensor (e.g., microcontroller 114 of eddy current sensor 102 as shown in FIG. 1). Method 500 may be at least partially implemented as executable instructions stored in a non-transitory memory of a controller communicatively coupled to the eddy current sensor (e.g., controller 110 of FIG. 1). In some examples, the eddy current sensor may be configured to sense a component of a vehicle and the controller may be a controller of the vehicle.

At 402, method 400 includes receiving an eddy current voltage signal (e.g., Vmeasurement). The eddy current voltage signal may be generated by a semiconductor circuit of the eddy current sensor such as semiconductor circuit 104 of FIG. 1. The eddy current voltage signal may be used to determine a position of a target object being sensed by the eddy current sensor.

At 404, method 400 includes receiving a temperature signal. In some examples the temperature signal may be received from the semiconductor circuit during an operation as a Vbackground. Vbackground may be a voltage measured by the semiconductor circuit when the semiconductor circuit is isolated from the sensing coil, and is thereby independent of a position of the target object. In other examples, the temperature signal may be received from a separate temperature sensing circuit, such as temperature sensing circuit 112 of FIG. 1. The temperature received at the microcontroller may be the temperature of the eddy current sensor which may be approximately equal to the temperature of the target object.

At 406, method 400 includes correcting the eddy current voltage signal for temperature and encoding the corrected eddy current voltage signal in a PWM duty cycle. Eddy current voltage may also be dependent on temperature. By correcting the eddy current voltage signal for temperature at 406, the corrected eddy current voltage signal may be related to a position of the target object which is independent of temperature. As described above, PWM duty cycle may be defined by $T_{on}/T_{cycle}$ and may be multiplied by 100 to be expressed as a percent.

At 408, method 400 includes encoding the temperature signal in a feature PWM signal. In one embodiment, 408 may include encoding the temperature signal in a feature may include encoding the temperature signal in a frequency of the PWM signal at 410. Frequency of the PWM signal may be defined as $1/T_{cycle}$. In an alternate embodiment, 408 may additionally or alternatively include encoding the temperature signal in a PWM logic level at 412. Encoding the temperature signal a PWM feature may include encoding the temperature signal in a PWM logic level and may include setting a baseline voltage level (e.g. low logic level) and/or the high voltage level (e.g., high logic level) according to the temperature signal. Method 400 may include encoding the temperature signal in the PWM signal based on a number of target objects. For example, the eddy current sensor may be configured to sense a first object and a second object and a first feature of the PWM signal may encode temperature of the first object and a temperature of the second object may be encoded in a second feature of the PWM signal. Additionally or alternatively, encoding the temperature signal in the PWM may be based on a desired resolution of the temperature signal, and/or a desired speed at which the temperature is updated.

At 414, method 400 includes outputting the signal to a controller. The controller may be a controller of a system which includes the eddy current sensor and the target object. As one example the eddy current sensor may be included in a vehicle and the controller may be an ECU of the vehicle. The output may be received and processed at the controller as described further below with respect to FIG. 5.

Turning now to FIG. 5, at 502, method 500 includes receiving the PWM signal from the eddy current sensor. Target object position and temperature information may be encoded in the signal as described above with respect to FIG. 4. At 504, method 500 includes determining the target object position and temperature based on the PWM signal. As one example a lookup table may be stored on the memory of the controller correlating a duty cycle of the PWM signal to the position of the target object and a frequency and/or logic level of the PWM signal to the temperature of the target object.

At 506, method 500 includes activating an actuator based on the target object position and determined temperature at step 504. As one example, activating the actuator may include moving a position of the target object. In the example where method 500 is executed by a controller of a vehicle, the actuator may be an electromagnetic solenoid coupled to the target object and the target object may be locking gear of a locking differential. The optimal position of the locking gear (e.g., target object) may be selected by the controller based at least partially on the temperature of the locking gear. Method 500 ends.

The technical effect of method 400 and method 500 is communication of a target object and position in a PWM signal. In this way, a system may take advantage of the temperature information demanded by an eddy current sensor and an addition of a dedicated temperature sensor may be avoided. Encoding both temperature and position in a single PWM signal may be computationally efficient. Avoiding an additional dedicated temperature sensor may reduce a manufacturing cost for the system.

The disclosure also provides support for a method for sensing temperature, comprising: acquiring a pulse width modulation (PWM) signal from an eddy current sensor, determining a temperature of the eddy current sensor based on a PWM signal feature, wherein the PWM signal feature is a PWM frequency and/or a PWM logic level. In a first example of the method, the eddy current sensor is configured to sense a position of a target object. In a second example of the method, optionally including the first example, the temperature of the eddy current sensor is approximately equal to a temperature of the target object. In a third example of the method, optionally including one or both of the first and second examples, the method further comprises: activating an actuator in response to the determined temperature. In a fourth example of the method, optionally including one or more or each of the first through third examples, the eddy current sensor and the target object are included in a vehicle. In a fifth example of the method, optionally including one or more or each of the first through fourth examples, the method further comprises: determining the position of the target object based on a duty cycle of the PWM signal. In a sixth example of the method, optionally including one or more or each of the first through fifth examples, the PWM logic level includes a high logic level and/or a low logic level.

The disclosure also provides support for an eddy current sensor, comprising: a semiconductor circuit configured to measure an eddy current voltage and a temperature dependent voltage, a microcontroller including instructions stored in non-transitory memory that, when executed cause the microcontroller to: receive an eddy current voltage signal and a temperature signal correct the eddy current voltage signal based on the temperature signal encode the corrected eddy current voltage signal in a duty cycle of a pulse width modulation (PWM) signal encode the temperature signal in a frequency or a logic level of the PWM signal, and output the PWM signal to a controller. In a first example of the system, the eddy current voltage is based on a position of a target object within a magnetic field generated by the eddy current sensor. In a second example of the system, optionally including the first example, the temperature signal is based on a temperature of the eddy current sensor. In a third example of the system, optionally including one or both of the first and second examples, the temperature signal is approximately equal to a target object sensed by the eddy current sensor. In a fourth example of the system, optionally including one or more or each of the first through third examples, the logic level of the PWM signal includes a high logic level and/or a low logic level. In a fifth example of the system, optionally including one or more or each of the first through fourth examples, the temperature signal is encoded in the frequency or the logic level of the PWM signal in response to a resolution and/or an update speed of the temperature signal.

The disclosure also provides support for a system, comprising: a target object, an eddy current sensor configured to sense a position and temperature of the target object and output the position and temperature of the target object encoded into a pulse width modulation (PWM) signal, a controller configured to receive the PWM signal and in response to the PWM signal, activate an actuator. In a first example of the system, the target object includes a first target object and a second target object. In a second example of the system, optionally including the first example, the temperature of the first target object is encoded into a first feature of the PWM signal and the temperature of the second target object is encoded into a second feature of the PWM signal. In a third example of the system, optionally including one or both of the first and second examples, the temperature and position of the target object are based on signals generated by a semiconductor circuit of the eddy current sensor. In a fourth example of the system, optionally including one or more or each of the first through third examples, the position of the target object is based on a signal generated by a semiconductor circuit of the eddy current sensor and the temperature is based on a signal generated by a temperature sensor of the eddy current sensor. In a fifth example of the system, optionally including one or more or each of the first through fourth examples, the position is encoded into a duty cycle of the PWM signal. In a sixth example of the system, optionally including one or more or each of the first through fifth examples, the temperature is encoded into a frequency of the PWM signal or a logic level of the PWM signal.

Note that the example control and estimation routines included herein can be used with various vehicle system configurations. The control methods and routines disclosed herein may be stored as executable instructions in non-transitory memory and may be carried out by the control system including the controller in combination/with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The invention claimed is:

1. A method for sensing temperature, comprising:
   acquiring a pulse width modulation (PWM) signal from a single coil of an eddy current sensor;
   determining a temperature of the eddy current sensor based on a frequency of the PWM signal, wherein the frequency is equal to a reciprocal of a cycle of the PWM signal; and
   determining a position of a target object based on a percentage of a duty cycle of the PWM signal.

2. The method of claim 1, wherein the temperature of the eddy current sensor is approximately equal to a temperature of the target object.

3. The method of claim 1, further comprising activating an actuator in response to the determined temperature.

4. The method of claim 1, wherein the eddy current sensor and the target object are included in a vehicle.

5. The method of claim 1, further comprising determining the position of the target object based on a duty cycle of the PWM signal.

6. The method of claim 1, wherein a PWM logic level includes a high logic level and/or a low logic level, the method further comprising determining the temperature based on the PWM logic level.

7. An eddy current sensor, comprising:
   a semiconductor circuit configured to measure an eddy current voltage and a temperature dependent voltage; and
   a microcontroller including instructions stored in non-transitory memory that, when executed, cause the microcontroller to:
   receive an eddy current voltage signal and a temperature signal,
   correct the eddy current voltage signal based on the temperature signal,
   encode the corrected eddy current voltage signal in a duty cycle of a pulse width modulation (PWM) signal,
   encode the temperature signal in a frequency or a logic level of the PWM signal, wherein the frequency is equal to a reciprocal of a cycle of the PWM signal and a position of a target object based on a percentage of a duty cycle of the PWM signal, and
   output the PWM signal to a controller.

8. The eddy current sensor of claim 7, wherein the eddy current voltage is based on the position of the target object within a magnetic field generated by the eddy current sensor.

9. The eddy current sensor of claim 7, wherein the temperature signal is based on the temperature of the eddy current sensor.

10. The eddy current sensor of claim 9, wherein the temperature signal is approximately equal to the target object sensed by the eddy current sensor.

11. The eddy current sensor of claim 7, wherein the logic level of the PWM signal includes a high logic level and/or a low logic level.

12. The eddy current sensor of claim 7, wherein the temperature signal is encoded in the frequency or the logic level of the PWM signal in response to a resolution and/or an update speed of the temperature signal.

13. A system, comprising:
    a target object;
    an eddy current sensor comprising only one coil and configured to sense a position and temperature of the target object and output the position and temperature of the target object encoded into a pulse width modulation (PWM) signal, the position based on a frequency of the PWM signal, wherein the frequency is equal to a reciprocal of a cycle of the PWM signal and a position of the target object based on a percentage of a duty cycle of the PWM signal; and
    a controller configured to receive the PWM signal and, in response to the PWM signal, activate an actuator.

14. The system of claim 13, wherein the target object includes a first target object and a second target object.

15. The system of claim 14, wherein the temperature of the first target object is encoded into a first feature of the PWM signal and the temperature of the second target object is encoded into a second feature of the PWM signal.

16. The system of claim 13, wherein the position of the target object is based on a signal generated by a semiconductor circuit of the eddy current sensor and the temperature is based on a signal generated by a temperature sensor of the eddy current sensor.

17. The system of claim 13, wherein the position is encoded into a duty cycle of the PWM signal.

18. The system of claim 13, wherein the temperature is encoded into a frequency of the PWM signal or a logic level of the PWM signal.

* * * * *